(12) United States Patent
Manabe et al.

(10) Patent No.: US 6,555,620 B1
(45) Date of Patent: Apr. 29, 2003

(54) CONDUCTIVE COMPOSITION WITH EXCELLENT HIGH-TEMPERATURE STORAGE STABILITY AND CONDUCTIVE ROLLER OBTAINED THEREFROM

(75) Inventors: Takao Manabe, Hyogo (JP); Masashi Sakaguchi, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/019,569

(22) PCT Filed: Jun. 28, 2000

(86) PCT No.: PCT/JP00/04259

§ 371 (c)(1),
(2), (4) Date: Dec. 31, 2001

(87) PCT Pub. No.: WO01/00727

PCT Pub. Date: Jan. 4, 2001

(30) Foreign Application Priority Data

Jun. 29, 1999 (JP) ............................................. 11-182687

(51) Int. Cl.$^7$ .................................................. C08F 8/00
(52) U.S. Cl. .................... 525/106; 524/506; 525/333.7; 525/342
(58) Field of Search ................................. 525/342, 106, 525/333.7; 524/506

(56) References Cited

FOREIGN PATENT DOCUMENTS

| | | |
|---|---|---|
| EP | 0 709 403 A1 | 5/1996 |
| EP | 0 844 257 | 5/1998 |
| EP | 0 850 995 A2 | 7/1998 |
| EP | 0 850 997 A2 | 7/1998 |
| JP | 3-294320 | 12/1991 |
| JP | 7-300564 | 11/1995 |
| JP | 2000-119507 | 4/2000 |
| JP | 2000-136275 | 5/2000 |

OTHER PUBLICATIONS

Patent Abstracts of Japan, vol. 1996, No. 03, Mar. 26, 1996 and JP 07 300564, Nov. 14, 1995.

*Primary Examiner*—Bernard Lipman
(74) *Attorney, Agent, or Firm*—Armstrong, Westerman & Hattori, LLP

(57) ABSTRACT

The addition of a compound containing an aliphatically unsaturated bond as a storage stability improver to a hydrosilylating addition reaction type hardenable electrically-conductive composition comprising at least one alkenyl group-containing isobutylene polymer which can undergo hydrosilylation reaction per molecule and an electrical conductivity-providing material makes it possible to obtain an electrically-conductive composition having an excellent storage stability at high temperatures. Further, the use of such an electrically-conductive composition makes it possible to provide an electrically-conductive roller having an excellent productivity and processability and an excellent stability of electrical properties against environmental change.

18 Claims, No Drawings

CONDUCTIVE COMPOSITION WITH EXCELLENT HIGH-TEMPERATURE STORAGE STABILITY AND CONDUCTIVE ROLLER OBTAINED THEREFROM

TECHNICAL FIELD

The present invention relates to an electrically-conductive composition having an excellent storage stability at high temperatures and an electrically-conductive roller prepared therefrom. More particularly, the electrically-conductive composition of the invention comprises a compound having at least one alkenyl group which can undergo hydrosilylation reaction per molecule and an isobutylene skeleton, a compound having at least two hydrosilyl groups per molecule, a hydrosilylation catalyst, a compound having aliphatically unsaturated bond, and an electrical conductivity-providing material. The composition of the invention exhibits a good storage stability at a temperature as high as 30° C. to 80° C.

BACKGROUND ART

An addition type hardenable composition comprising a compound having an alkenyl group and an isobutylene skeleton, a compound having a hydrosilyl group and a hydrosilylating catalyst or an electrically-conductive composition obtained by adding an electrical conductivity-providing material to such an addition type hardenable composition is known.

However, these compositions are mainly composed of polymer and thus have a relatively high viscosity. The components in these compositions may undergo thickening. Thus, these compositions are disadvantageous in that their workability and processability are very poor.

In order to lower the viscosity of the foregoing composition and hence eliminate the foregoing disadvantage, it has heretofore been practiced to add a plasticizer having a lower viscosity than that of main components or the like. However, it is disadvantageous in that when a large amount of plasticizer is added, the hardened product obtained by hardening the composition exhibits deteriorated physical properties and there is a great risk of bleed, etc.

On the other hand, as the temperature rises, these polymers show a viscosity drop. Thus, it is thought that if the composition can be handled at temperatures higher than ordinary temperature, a good workability can be given and no adverse effects can be given to the physical properties thereof. However, these compositions are disadvantageous in that they are not always excellent in storage stability at temperatures higher than room temperature and thus can readily be gelled, that is, they exhibit an extremely poor storage stability at high temperatures (e.g., higher than room temperature) (as described in JP-A-3-188166 (The term "JP-A" as used herein means an "unexamined published Japanese patent application"), U.S. Pat. No. 3,445,420).

Further, according to U.S. Pat. No. 5,629,387, the use of a long-chain α-acetylene alcohol makes it possible to improve storage stability. However, this approach is disadvantageous in that the resulting composition exhibits a deteriorated hardenability.

Various techniques are known for composition for addition type hardenable electrically-conductive roller comprising a liquid polymer (as described in JP-A-7-300564, JP-A-11-80669). However, it is the status of quo that no compositions having an excellent storage stability and hardenability have been obtained yet.

In general, an electrically-conductive roller is made of a resin such as urethane and NBR. However, a roller prepared from these resins is disadvantageous in that it is subject to change of electrical properties due to environmental change because these resins are somewhat hygroscopic themselves.

The present invention has been worked out in the light of these circumstances. The present invention provides an electrically-conductive composition having an excellent storage stability at high temperatures which can be handled at temperatures higher than room temperature and an electrically-conductive roller having an excellent productivity.

DISCLOSURE OF THE INVENTION

The inventors made extensive studies of solution to the foregoing problems. As a result, it was found that the addition of a compound containing an aliphatically unsaturated bond as a storage stability improver to the foregoing electrically-conductive composition which can undergo hydrosilylation reaction makes it possible to obtain a composition having an excellent storage stability at temperatures higher than room temperature and the use of such a composition makes it possible to obtain an electrically-conductive roller having an excellent productivity and processability because the viscosity thereof can be lowered by heating. The present invention has thus been worked out.

Further, the electrically-conductive roller of the invention is characterized in that since the isobutylene polymer as a main component has a low hygroscopicity, the roller exhibits an excellent stability of electrical properties against environmental change.

The electrically-conductive composition of the invention comprises the following components (A) to (E):

(A) An isobutylene polymer having at least one alkenyl group which can undergo hydrosilylation reaction per molecule;

(B) A compound having at least two hydrosilyl groups per molecule;

(C) A hydrosilylation catalyst;

(D) An acetylene alcohol having the following structure:

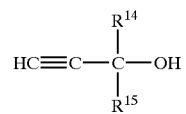

wherein $R^{14}$ and $R^{15}$ each independently represent a hydrogen atom, alkyl group or aryl group, with the proviso that $R^{14}$ and $R^{15}$ may be connected to each other to form a ringp; and (E) An electrical conductivity-providing material.

In an embodiment, the component (D) is an acetylene alcohol having a molecular weight of not smaller than 110.

In an embodiment, the component (D) is an acetylene alcohol having a boiling point of not lower than 140° C. at ordinary pressure.

In an embodiment, the sum of the number of carbon atoms in $R^{14}$ and $R^{15}$ in the general formula of acetylene alcohol is from 4 to 8.

In an embodiment, the component (D) is an ester compound having an aliphatically unsaturated bond.

In an embodiment, the component (D) is at least one compound selected from the group consisting of 2-phenyl-3-butyne-2-ol, 1-ethynyl-1-cyclohexanol and 3,5-dimethyl-1-hexyne-3-ol.

In an embodiment, the component (E) is carbon black.

In another aspect of the invention, an electrically-conductive roller obtained by hardening any of the foregoing compositions around a metallic shaft is provided.

In an embodiment, the electrically-conductive roller is obtained by heating the composition to a temperature of from 30° C. to 80° C., injecting the composition into a mold, and then hardening the mold at a temperature of not lower than 100° C.

In an embodiment, the electrically-conductive roller is obtained by treating the foregoing composition as a two-part liquid composition consisting of a composition (I) comprising components (A), (B), (C), (D) and (E) and a composition (II) comprising components (A), (B), (D) and (E), heating the various compositions to a temperature of from 30° C. to 80° C., measuring the weight of the various compositions, injecting the various compositions into a mold while being mixed, and then hardening the mixture at a temperature of not lower than 100° C.

In an embodiment, the ratio (I)/(II) of viscosity of the composition (I) to the composition (II) is from 0.5 to 2.0.

In an embodiment, the roller resistivity is from $10^7$ to $10^{11}$ Ω.

In an embodiment, the roller resistivity is from $10^3$ to $10^{10}$ Ω.

In an embodiment, the roller resistivity is from $10^5$ to $10^{10}$ Ω.

In an embodiment, the roller hardness is of not greater than 30°.

BEST MODE FOR CARRYING OUT THE INVENTION

The component (A) to be used in the invention is an isobutylene polymer having at least one alkenyl group which can undergo hydrosilylation reaction per molecule. The term "isobutylene polymer" as used herein is meant to indicate one having a skeleton mainly composed of isobutylene units as monomer units. In this case, all the monomers may be formed by isobutylene units. Monomer units copolymerizable with isobutylene may be contained in an amount of not greater than 50% (by weight hereinafter), more preferably not greater than 30%, particularly not greater than 20% based on the weight of the isobutylene polymer. In the polymer skeleton, however, it is particularly preferred that the repeating units substantially free of carbon-carbon unsaturated bond other than aromatic ring which constitute the main chain excluding the alkenyl group be composed of saturated hydrocarbon from the standpoint of humidity resistance, weathering resistance and heat resistance. The isobutylene copolymer to be used as component (A) in the invention may comprise a unit monomer which leaves double bonds after polymerization such as polyene compound (e.g., butadiene, isoprene, 1,13-tetradecadiene, 1,9-decadiene, 1,7-octadiene, 1,5-hexadiene) in a small amount, preferably in an amount of not greater than 10%, so far as the objects of the invention can be accomplished.

Specific examples of the copolymerizing components constituting the main chain skeleton of the isobutylene polymer include 1-butene, 2-butene, 2-methyl-butene, 3-methyl-1-butene, pentene, 4-methyl-1-pentene, hexene, vinyl cyclohexane, methyl vinyl ether, ethyl vinyl ether, isobutyl vinyl ether, styrene, α-methylstyrene, dimethylstyrene, p-t-butoxystyrene, p-hexenyloxystyrene, p-allyloxystyrene, p-hydroxystyrene, β-pinene, indene, vinyl dimethyl methoxysilane, vinyl trimethylsilane, divinyl dimethoxysilane, divinyl dimethylsilane, 1,3-divinyl-1,1,3,3-tetramethyldisiloxane, trivinyl methylsilane, tetravinylsilane, allyl dimethyl methoxysilane, allyl trimethylsilane, diallyl dimethoxysilane, diallyl dimethylsilane, γ-methacryloyloxypropyl trimethoxysilane, γ-methacryloyloxy propyl methyl dimethoxysilane, etc.

The alkenyl group which can undergo hydrosilylation reaction is not specifically limited so far as it is a group having a carbon-carbon double bond active to hydrosilylation reaction. Examples of the alkenyl group include aliphatic unsaturated hydrocarbon group such as vinyl group, allyl group, methyl vinyl group, propenyl group, butenyl group, pentenyl group and hexenyl group, cyclic unsaturated hydrocarbon group such as cyclopropenyl group, cyclobutenyl group, cyclopentenyl group and cyclohexenyl group, and methacryl group. In the invention, the component (A) preferably has from 1 to 10 alkenyl groups per molecule. When the number of alkenyl groups is too great, the resulting hardened product can easily become rigid, making it difficult to obtain a good rubber elasticity. When the number of alkenyl groups is too small, the resulting composition can difficultly become sufficiently hardened.

The alkenyl group which can undergo hydrosilylation reaction preferably exists at the terminal of the molecule. Thus, the alkenyl group preferably exists at the terminal of the polymer because the finally formed hardened product has many effective network chains, making it easy to obtain a rubber-like hardened product having a high strength.

The number-average molecular weight (as determined by GPC method in polystyrene equivalence) of the foregoing isobutylene polymer is preferably from about 1,000 to 50,000. In particular, a liquid or fluid isobutylene polymer having a number-average molecular weight of from about 2,000 to 30,000 is preferred.

Referring to the process for the preparation of the component (A) of the invention, the component (A) can be prepared by the process described in JP-A-9-71611.

The process for the introduction of alkenyl group in the preparation of the component (A) can be roughly divided into two groups, i.e., process which comprises the introduction of alkenyl group after the preparation of polymer and process which comprises the introduction of alkenyl group during the preparation of polymer.

Referring to the process which comprises the introduction of alkenyl group after polymerization, the hydroxyl group at the end or in the main or side chain of the polymer is converted to a group such as —ONa or —OK. Subsequently, the polymer is reacted with an organic halogen compound represented by the following general formula (1):

$$CH_2=CH-R_1-Y \qquad (1)$$

wherein Y represents a halogen atom such as chlorine atom and iodine atom; and $R_1$ represents a divalent organic group represented by —$R_2$—, —$R_2$—OC(=O)— or —$R_2$—C)=O)— (in which $R_2$ represents a $C_1-C_{20}$ divalent hydrocarbon group, preferably an alkylene, cycloalkylene, arylene or aralkylene group), particularly a divalent group selected from the group consisting of groups represented by $R_3$—$C_6H_4$—$CH_2$— (in which $R_3$ is a $C_{1-C10}$ hydrocarbon group) to prepare an isobutylene polymer having a terminal alkenyl group. As the process for the conversion of the terminal hydroxyl group in the hydroxyl-terminated isobutylene polymer to oxymetal group there may be used a process which comprises reacting the hydroxyl-terminated isobutylene polymer with an alkaline metal such as Na and K, metal hydride such as NaH, metal alkoxide such as $NaOCH_3$, caustic alkali such as caustic soda and caustic potassium or the like.

Specific examples of the organic halogen compound represented by the foregoing general formula (1) include allyl chloride, allyl bromide, vinyl(chloromethyl)benzene, allyl(chloromethyl)benzene, allyl(bromomethyl)benzene, allyl(chloroethyl)ether, allyl(chloromethoxy)benzene, 1-hexenyl(chloromethoxy)benzene, allyloxy(chloromethyl)benzene, etc. The present invention is not limited to these organic halogen compounds. Preferred among these organic halogen compounds is allyl chloride because it is inexpensive and can easily undergo reaction.

The process for the introduction of alkenyl group into the isobutylene polymer having covalently bonded Cl group is not specifically limited. For example, however, there may be used a process which comprises Friedel-Crafts reaction of various alkenyl phenyl ethers with Cl group, a process which comprises substitution reaction of allyl trimethylsilane or the like with Cl group in the presence of a Lewis acid, a method which comprises subjecting various phenols and Cl group to Friedel-Crafts reaction to introduce hydroxyl group into the phenols, and then performing the foregoing process for the introduction of alkenyl group, or the like.

Examples of the process which comprises the introduction of alkenyl group during polymerization include a process for the preparation of an isobutylene polymer terminated by allyl which comprises the addition of an allyl trimethylsilane to the polymerization system in the cationic polymerization of cationically polymerizable monomers containing isobutylene in the presence of a compound having a halogen atom bonded to a carbon atom which is bonded to a carbon in an aromatic ring and/or compound having a halogen atom bonded to a carbon atom which is a tertiary carbon atom as an initiator/chain transfer agent and a Lewis acid as a catalyst, and a process for the preparation of an isobutylene polymer having alkenyl group at the end of main chain or side chain which comprises the addition of a non-conjugated diene such as 1,9-decadiene or alkenyloxystyrene such as p-hexenyloxystyrene in the same cationic polymerization as mentioned above.

Examples of the Lewis acid which can be used as a cationic polymerization catalyst include compounds represented by the general formula MX'n (in which M is a metal atom, and X' is a halogen atom) (e.g., $BCl_3$, $Et_2AlCl$, $EtAlCl_2$, $AlCl_3$, $SnCl_4$, $TiCl_4$, $VCl_5$, $FeCl_3$, $BF_3$). However, the present invention is not limited to these compounds. Preferred among these Lewis acids are $BCl_3$, $SnCl_4$, $BF_3$. Even more desirable among these Lewis acids is $TiCl_4$. The amount of the Lewis acid to be used is preferably from 0.1 to 10 mols, more preferably from 2 to 5 mols per mol of the initiator/chain transfer agent.

The component (B) to be used in the composition of the invention will be described hereinafter.

As the compound having hydrosilyl group as the component (B) there may be used a compound having two or more hydrosilyl groups per molecule.

The term "hydrosilyl group" as used herein is meant to indicate a silyl group represented by the general formula $H_nR_{(3-n)}Si$— (in which R is an arbitrary monovalent group) having a hydrogen atom bonded to the silicon atom contained therein. In the specification, a group having two hydrogen atoms (H) bonded to a silicon atom (Si) is considered two hydrosilyl groups for convenience.

Preferred examples of the compound as component (B) include polyorganohydrogen siloxane. A polyorganohydrogen siloxane is a siloxane compound having a hydrocarbon group or hydrogen atom on a silicon atom. The siloxane compound may be chain-like or cycle for example and is specifically represented, e.g., by the following general formula:

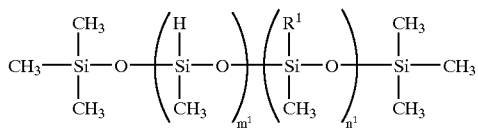

wherein $m^1$ is not smaller than 2; $n^1$ is not greater than 0, with the proviso that the sum of $m^1$ and $n^1$ is from not smaller than 2 to not greater than 50; and $R^1$ represents a $C_2$–$C_{20}$ hydrocarbon group except alkenyl group and alkynyl group, with the proviso that $R^1$ may be replaced by one or more phenyl groups as necessary.

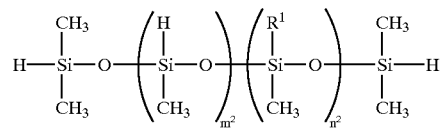

wherein $m^2$ is not smaller than 0; $n^2$ is not smaller than 0, with the proviso that the sum of $m^2+n^2$ is from not smaller than 0 to not greater than 50; and $R^2$ represents a $C_2$–$C_{20}$ hydrocarbon group except alkenyl group and alkynyl group, with the proviso that $R^2$ may be replaced by one or more phenyl groups as necessary.

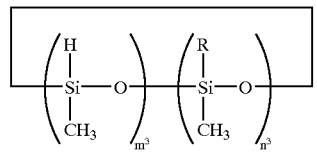

wherein $m^3$ is from not smaller than 2 to not greater than 19; $n^3$ is from not smaller than 0 to less than 18, with the proviso that the sum of $m^3+n^3$ is from not smaller than 3 to not greater than 20; and $R^3$ represents a $C_2$–$C_{20}$ hydrocarbon group, with the proviso that $R^3$ may be replaced by one or more phenyl groups as necessary.

Alternatively, the siloxane compound may have two or more siloxane units and is specifically represented, e.g., by the following general formula:

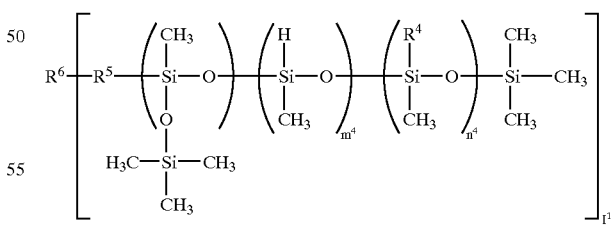

wherein $m^4$ is not smaller than 1; $n^4$ is not smaller than 0, with the proviso that the sum of $m^4+n^4$ is from not smaller than 1 to not greater than 50; $R^4$ represents a $C_2$–$C_{20}$ hydrocarbon group, with the proviso that $R^4$ may be replaced by one or more phenyl groups as necessary; $l^1$ is not smaller than 2; $R^5$ may be a divalent organic group or may not be present; and $R^6$ represents a divalent to tetravalent organic group.

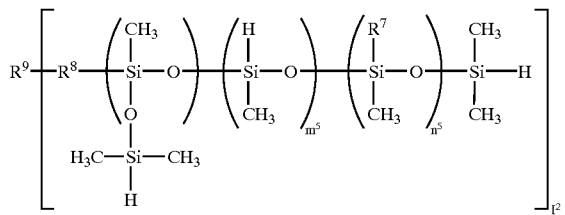

wherein $m^5$ is not smaller than 0; $n^5$ is not smaller than 0, with the proviso that the sum of $m^5+n^5$ is from not smaller than 0 to not greater than 50; $R^7$ represents a $C_2$–$C_{20}$ hydrocarbon group, with the proviso that $R^7$ may be replaced by one or more phenyl groups as necessary; $l^2$ is not smaller than 2; $R^8$ may be a divalent organic group or may not be present; and $R^9$ represents a divalent to tetravalent organic group.

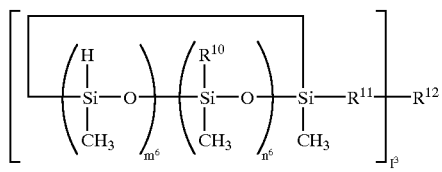

wherein $m^6$ is not smaller than 1; $n^6$ is not smaller than 0, with the proviso that the sum of $m^6+n^6$ is from not smaller than 3 to not greater than 50; $R^{10}$ represents a $C_2$–$C_{20}$ hydrocarbon group, with the proviso that $R^{10}$ may be replaced by one or more phenyl groups as necessary; $l^3$ is not smaller than 2; $R^{11}$ may be a divalent organic group or may not be present; and $R^{12}$ represents a divalent to tetravalent organic group.

The component (B) preferably has a good compatibility with the components (A), (C), (D) and (E) or a good dispersion stability in the system. In particular, in the case where the viscosity of the entire system is low, when the component (B) has a low compatibility with the foregoing various components, phase separation can easily occur, causing malhardening. Therefore, in order to prevent phase separation, the composition may comprise a filler having a smaller particle diameter such as particulate silica incorporated therein as a dispersing agent.

Specific examples of the component (B) having a good compatibility with the component (A), (C), (D) or (E) or a good dispersing agent include the following compounds.

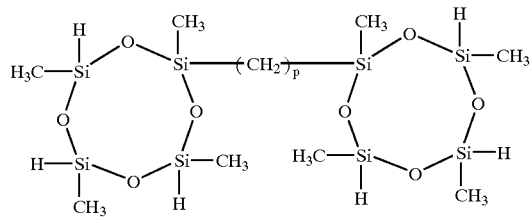

wherein p represents an integer of from 6 to 12.

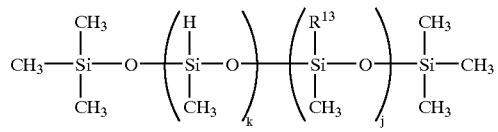

wherein k is from greater than 2 to less than 10; j is from greater than 0 to less than 5; and $R^{13}$ represents a hydrocarbon group having 8 or more carbon atoms.

The amount of the component (B) to be used is preferably such that the total number of mols of hydrogen atoms bonded to silicon atom in the component (B) is from 0.8 to 5.0 equivalents based on the total number of mols of alkenyl groups in the component (A). When the amount of hydrogen atoms bonded to silicon atom in the component (B) based on the total amount of alkenyl groups in the component (A) is too small, insufficient crosslinking can easily occur. On the contrary, when the amount of hydrogen atoms bonded to silicon atom in the component (B) based on the total amount of alkenyl groups in the component (A) is too great, hydrogen atoms bonded to silicon atom can easily be left in the hardened composition, giving an effect of drastically changing the physical properties of the composition. In order to inhibit this effect in particular, the amount of the component (B) is preferably predetermined to be from 1.0 to 2.0 equivalents.

The hydrosilylation catalyst as component (C) is not specifically limited. Any hydrosilylation catalyst may be used. Specific examples of the hydrosilylation catalyst include catalyst having a solid platinum supported on a carrier such as chloroplatinic acid, single body of platinum, alumina, silica and carbon black, platinum-vinyl siloxane complex {e.g., $Pt_n(ViMe_2SiOSiMe_2Vi)_n$, $Pt[(MeViSiO)_4]_m$}, platinum-phosphine complex {e.g., $Pt(PPh_3)_4$, $Pt(PBu_3)_4$}, platinum-phosphite complex {e.g., $Pt(OPh)_3]_4$, $Pt[P(OBu)_3]_4$} (in which Me represents a methyl group, Bu represents a butyl group, Vi represents a vinyl group, Ph represents a phenyl group, and n and m each represent an integer), $Pt(acac)_2$, platinum-hydrocarbon composite disclosed in U.S. Pat. Nos. 3,159,601 and 3,159,662 to Ashby et al., platinum alcoholate catalyst disclosed in U.S. Pat. No. 3,220,972 to Lamoreaux et al.

Examples of catalysts other than platinum compound include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, etc. These catalysts may be used singly or in combination of two or more thereof. From the standpoint of catalytic activity, platinum-olefin complex, platinum-vinyl siloxane complex, $Pt(acac)_2$, etc. are preferred.

The amount of the catalyst as component (C) is not specifically limited but is preferably from $10^{-1}$ to $10^{-8}$ mols, more preferably $10^{-2}$ to $10^{31\ 6}$ mols per mol of the alkenyl group in the component (A). Since a hydrosilylation catalyst is normally expensive and corrosive and can cause the production of a large amount of hydrogen gas that foams the hardened product, it is preferred that the hydrosilylation catalyst be not used too much.

The component (D) is a component which prevents gelation or thickening of the composition of the invention attributed to the component (B) or deactivation of the hydrosilylation catalyst as component (C) to allow the improvement of storage stability at temperatures higher than room temperature.

Examples of the compound as component (D) include acetylene alcohols represented by the following general formula:

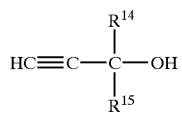

wherein $R^{14}$ and $R^{15}$ each independently represent a hydrogen atom, alkyl group or aryl group, with the proviso that $R^{14}$ and $R^{15}$ may be connected to each other to form a ring.

In particular, in these acetylene alcohols, the bulkiness of $R^{14}$ or $R^{15}$ makes a great contribution to the storage stability of the composition. Therefore, the compound wherein $R^{14}$ or $R^{15}$ is bulky is preferred from the standpoint of storage stability at high temperatures. However, when $R^{14}$ or $R^{15}$ is too bulky, it is disadvantageous in that the resulting composition can easily have a bad hardenability. Therefore, it is important to select an acetylene alcohol having well-balanced storage stability and hardenability.

Preferred examples of the acetylene alcohol having well-balanced storage stability and hardenability include those having a molecular weight of not smaller than 110 and/or a boiling point of not lower than 140° C. at ordinary pressure. Further examples of the acetylene alcohol having well-balanced storage stability and hardenability include the foregoing compound wherein the total number of carbon atoms in $R^{14}$ and $R^{15}$ is from 4 to 8. Examples of these acetylene alcohols include 2-chenyl-3-butyne-2-ol, 1-ethynyl-1-cyclohexanol, 3,5-dimethyl-1-hexyne-3-ol, etc.

The amount of the component (D) to be used may be such arbitrary that the component (D) can be uniformly dispersed in the components (A) and (B). It is preferably from 2 to 10,000 mols per mol of the hydrosilylation catalyst as component (C). The compounds containing aliphatically unsaturated bond as component (D) may be used singly or in combination of two or more thereof.

The component (E) is a component which renders the composition of the invention or a hardened product obtained therefrom electrically conductive. Examples of the electrical conductivity-providing material as component (E) include carbon black, metal oxide, quaternary ammonium salt, organic compound or polymer having carboxylic acid group, sulfonic acid group, sulfuric acid ester group, phosphoric acid ester group, etc., compound having electrically-conductive unit such as ether esterimide polymer, ether imide polymer, ethylene oxide-epihalohydrin copolymer and methoxy polyethylene glycol acrylate, and compound such as antistat for polymer compound.

Examples of the foregoing carbon black include furnace black, acetylene black, lamp black, channel black, thermal black, oil black, etc. The kind, particle diameter, etc. of these carbon blacks are not limited.

Since the hydrosilylation reaction can be inhibited depending on the kind and added amount of the electrical conductivity-providing material, it is preferred that an electrical conductivity-providing material having little effect on the hydrosilylation reaction be used.

The amount of the component (E) to be incorporated can be arbitrarily predetermined according to the required electrical conductivity of the formed product to be obtained. It is preferably from 0.1 to 200 parts by weight, more preferably from 1 to 100 parts by weight based on 100 parts by weight of the polymer as component (A). When the amount of the component (E) to be incorporated is too small, it is more likely that the resulting electrically-conductive material can have scattered electrical conductivity. On the contrary, when the amount of the component (E) to be incorporated is too great, the fluidity of the composition can be easily deteriorated, deteriorating the processability thereof.

The substituents of the invention represented by the foregoing general formulae will be described hereinafter.

The term "hydrocarbon" as used herein preferably means an alkyl group, alkenyl group, alkynyl group, aryl group, aralkyl group or cycloalkyl group unless otherwise specified.

The alkyl group is an alkyl group preferably having from 1 to 30 carbon atoms, more preferably from 1 to 20 carbon atoms, even more preferably from 1 to 10 carbon atoms, e.g., methyl, ethyl, propyl.

The alkenyl group is an alkenyl group preferably having from 2 to 30 carbon atoms, more preferably from 2 to 20 carbon atoms, even more preferably from 2 to 10 carbon atoms, e.g., vinyl, allyl.

The alkynyl group is an alkynyl group preferably having from 2 to 30 carbon atoms, more preferably from 2 to 20 carbon atoms, even more preferably from 2 to 10 carbon atoms, e.g., ethynyl, propargyl.

The aryl group is an aryl group preferably having from 6 to 30 carbon atoms, more preferably from 6 to 20 carbon atoms, even more preferably from 6 to 10 carbon atoms, e.g., phenyl, tollyl, naphthyl.

The aralkyl group is an aralkyl group preferably having from 7 to 30 carbon atoms, more preferably from 7 to 20 carbon atoms, even more preferably from 7 to 10 carbon atoms, e.g., benzyl, phenethyl.

The cycloalkyl group is a cycloalkyl group preferably having from 3 to 10 carbon atoms, more preferably from 3 to 8 carbon atoms, e.g., cyclopentyl, cyclohexyl.

The alkoxy group is an alkoxy group preferably having from 1 to 30 carbon atoms, more preferably from 1 to 20 carbon atoms, even more preferably from 1 to 10 carbon atoms, e.g., methoxy, ethoxy, propoxy.

The divalent organic group is a divalent organic group having no carbon atom, preferably from 1 to 10 carbon atoms, more preferably from 1 to 3 carbon atoms, e.g., methylene, ethylene.

The divalent to tetravalent organic group is, e.g., the foregoing divalent organic group having N or C added thereto.

In a preferred embodiment, the composition of the invention is added in an amount such that the resistivity of the roller obtained from the composition of the invention is from $10^7$ to $10^{11}$ Ω.

In another preferred embodiment, the composition of the invention is added in an amount such that the resistivity of the roller obtained from the composition of the invention is from $10^3$ to $10^9$ Ω.

In a further preferred embodiment, the composition of the invention is added in an amount such that the resistivity of the roller obtained from the composition of the invention is from $10^5$ to $10^{10}$ Ω.

The electrically-conductive composition of the invention may comprise a plasticizer incorporated therein for the purpose of adjusting the viscosity of the composition or the hardness of the formed product obtained from the composition. Examples of the plasticizer include hydrocarbons or substituted hydrocarbons having a low polarity. Specific examples of these plasticizers include saturated hydrocarbon-based process oils having a molecular weight of from 300 to 1,000, etc. The amount of the plasticizer to be used is preferably not greater than 150 parts by weight based on 100 parts by weight of the component (A). When the amount of the plasticizer to be used exceeds the above defined range, problems such as bleed can easily occur.

An adhesivity providing agent or adhesivity providing resin for enhancing the adhesivity to various supports (e.g., metal core, plastic film, metal foil, paper) may be incorporated in the electrically-conductive composition of the invention according to the foregoing necessity. Examples of the adhesivity providing agent include various silane coupling agents, epoxy resins, etc. In particular, a silane coupling agent having a functional group such as epoxy group, methacryloyl group and vinyl group has little effect on the hardenability of the composition and exerts a great effect of realizing adhesivity and thus can be easily used. However, the silane coupling agent employable herein is not limited to these compounds. Alternatively, these reaction catalysts may be added in combination with the silane coupling agent or epoxy resin. For the use of these components, their effects on the hydrosilylation reaction must be considered.

The adhesivity-providing resin is not specifically limited. In general, any resins which are used as adhesivity-providing agent may be used. Specific examples of these resins include phenol resin, modified phenol resin, cyclopentadiene-phenol resin, xylene resin, coumarone resin, petroleum resin, terpene resin, terpene phenol resin, rosin ester resin, etc. Particularly preferred among these resins are terpene resin and petroleum resin because they have a good compatibility and adhesivity.

The electrically-conductive composition of the invention may comprise various fillers, oxidation inhibitors, ultraviolet absorbers, pigments, surface active agents, solvents, silicon compounds, etc. incorporated properly therein according to the necessity of properties of the desired formed products. Specific examples of the foregoing fillers include particulate silica, calcium carbonate, clay, talc, titanium oxide, zinc white, diatomaceous earth, barium sulfate, etc. Particularly preferred among these fillers is particulate silica preferably having a particle diameter of from about 50 nm to 70 nm (BET specific surface area: 50 to 380 $m^2/g$). Among these products, surface-treated hydrophobic silica is particularly preferred because it has a great effect of improving the strength of the electrically-conductive composition in a desirable manner.

The composition of the invention is formed and heat-cured by a conventional known method to form an electrically-conductive formed product. For example, by injecting the composition of the invention into a mold having a forming space having a desired shape such as that of roller, and then heating the composition, an electrically-conductive formed product having a desired shape can be obtained.

In some detail, formation can be carried out by liquid injection molding, extrusion, press molding or the like. Liquid injection molding is preferred because the composition is liquid and from the standpoint of productivity. The electrically-conductive composition according to the invention is relatively excellent in storage stability even at high temperatures and thus can be heated so that it can be treated with a low viscosity. Thus, the composition of the invention is suitable for liquid injection molding at high temperatures.

The composition of the invention is hardened, e.g., by the reaction of addition of Si—H group to alkenyl group in the presence of a noble metal catalyst. Accordingly, this process provides a very high curing rate and is favorable to industrial production. The temperature at which the composition of the invention is heat-cured is preferably not lower than 100° C., more preferably from 120° C. to 200° C. When the temperature is lower than 100° C., curing reaction proceeds little because the composition has an excellent storage stability. However, when the temperature is not lower than 100° C., hydrosilylation reaction proceeds suddenly, making it possible to cure the composition in a short period of time.

The electrically-conductive composition of the invention can be used preferably as a material from which an electrically-conductive roller is prepared. In some detail, the electrically-conductive composition of the invention can be used preferably for charging roller, developing roller, transferring roller, paper feed roller, cleaning roller and fixing pressure roller for electrophotographic apparatus.

The process for the preparation of the foregoing electrically-conductive roller is not specifically limited. Any conventional known process for the formation of various rollers may be used. For example, the foregoing electrically-conductive composition is formed in a mold in the center of which a metallic shaft made of SUS or the like is placed by any forming method such as extrusion, press molding, injection molding, reaction injection molding (RIM), liquid injection molding (LIM) and casting molding, and then heat-cured at a proper temperature in a proper period of time to form an electrically-conductive elastic layer around the shaft. In this case, the foregoing hardenable electrically-conductive composition may be half-cured before curing process by which it is completely cured. Further, a single or a plurality of layers may be provided outside the foregoing electrically-conductive elastic layer. For example, a surface layer-forming resin may be spray-coated, roll-coated or dip-coated onto the foregoing electrically-conductive elastic layer to a predetermined thickness, and then dried and cured at a predetermined temperature to provide a surface layer thereon.

The process for the preparation of an electrically-conductive roller from the electrically-conductive composition of the invention will be described with reference to specific examples.

An example of the process for the preparation of an electrically-conductive roller of the invention is liquid injection molding. By injecting the composition of the invention into a mold having a molding space having a desired roller shape, and then heating the composition, an electrically-conductive roller having a desired shape can be obtained. In this case, it is preferred from the standpoint of productivity or inhibition of occurrence of poor external appearance that the composition be heated to a temperature of from 30° C. to 80° C. where it is then molded at a lowered viscosity.

A preferred embodiment of the foregoing liquid injection molding is a two-part liquid process. In the invention, this two-part liquid process is of greater advantage than one-part liquid process from the standpoint of storage stability because the components (B) and (C) can be treated as separate compositions as described later. The electrically-conductive composition of the invention is preferably treated as two liquids:

(I) a composition consisting of components (A), (C), (D) and (E); and (II) a composition consisting of components (A), (B), (D) and (E).

The various compositions are heated to a temperature of from 30° C. to 80° C., separately measured for weight, injected into a mold while being mixed, and then heat-cured to obtain an electrically-conductive roller. The temperature at which the composition is heat-cured is preferably not lower than 120° C.

The ratio (I)/(II) of viscosity of the composition (I) to the composition (II) at a temperature of from 30° C. to 80° C. is preferably from 0.5 to 2.0. When the difference in viscosity between the two components (I) and (II) is great, the two liquid compositions cannot be sufficiently mixed, making it impossible to exhibit stabilized electrical conductivity.

The viscosity of the composition at the forming temperature is preferably not higher than 500 Pa·s, more preferably not higher than 200 Pa·s. When the viscosity of the composition is too high, the resulting productivity or processability is deteriorated to disadvantage.

The resistivity of the foregoing electrically-conductive roller is properly predetermined according to the desired properties of the roller. An electrically-conductive roller having a resistivity of from $10^7$ to $10^{11}$ Ω can be used, e.g., as a transferring roller for electrophotographic apparatus. An electrically-conductive roller having a resistivity of from $10^3$ to $10^9$ Ω can be used, e.g., as a developing roller for electrophotographic apparatus. An electrically-conductive roller having a resistivity of from $10^5$ to $10^{10}$Ω can be used, e.g., as a charging roller for electrophotographic apparatus.

The roller resistivity can be adjusted to a desired range by varying the amount of the electrical conductivity-providing material as component (E) to be incorporated in the foregoing hardenable electrically-conductive composition. The roller resistivity indicates the electrical resistivity measured when a d.c. voltage of 100 V is applied across the electrically-conductive roller with a metal plate horizontally pressed against the roller at a load of 500 g applied toward the metal plate.

In the invention, the roller hardness is measured in accordance with the method defined in JIS K6301A. In some detail, the electrically-conductive roller according to the invention is measured using a Type A hardness tester as a measuring instrument. The hardness of the electrically-conductive roller of the invention is preferably not greater than 30°, more preferably not greater than 25° in terms of JIS A hardness to lessen toner stress. The hardness of the hardened product can be easily adjusted by adjusting the amount of the electrically-conductive composition of the invention to be incorporated.

The present invention will be further described in the following examples, but the present invention should not be construed as being limited thereto.

EXAMPLE 1

A plasticizer PW-90 (saturated hydrocarbon-based process oil produced by Idemitsu Kosan Co., Ltd.), carbon black (#35, produced by Asahi Carbon Co., Ltd.) as component (E) and MARK AO-50 (produced by ASAHI DENKA KOGYO K.K.) as an oxidation inhibitor were mixed with EP400A (produced by KANEKA CORPORATION) which is an allyl-terminated polyisobutylene polymer as component (A) in an amount of 50 g, 20 g and 1 g based on 100 g of EP400A, respectively. The mixture was then kneaded over a roller three times. To the mixture was then added 5.3 g of CR100 (produced by KANEKA CORPORATION) as component (B).

Bis(1,3-divinyl-1,1,3,3-tetramethyldisiloxane)-platinum complex catalyst ($17.9 \times 10^{-5}$ mmol/µl, xylene solution) as component (C) was measured out in an amount of 57 µl ($5 \times 10^{-4}$ mols per mol of the alkenyl group in the component (A)). 2-Phenyl-3-butyne-2-ol was measured out in an amount of 0.3 g, which corresponds to 200 molar equivalents based on platinum. The two components were then uniformly mixed. The hardenable composition thus obtained was then stored in a 50° C. oven. Those showing no gelation after several weeks of elapse were evaluated as ○. Those showing even a slight gelation after several weeks of elapse were evaluated as X. During the same elapse of time, these compositions were measured for snap-up time at a temperature of 150° C. The term "snap-up time" as used herein is meant to indicate the time required until the composition thus incorporated can be visually judged hardened at a predetermined temperature. In some detail, snap-up time was determined by measuring the time required until a small amount of the composition can be visually judged hardened when stirred with a slender wood piece having a rounded end on an aluminum plate heated over a hot plate the temperature of which has been adjusted to 150° C. The formulation and results of evaluation are set forth in Table 1.

The composition was heated to a temperature of 50° C. for 5 hours to have a lowered viscosity, and then defoamed by a vacuum-defoaming apparatus for 1 hour. The composition was packed into an aluminum frame over which a teflon sheet was spread, and then heated to a temperature of 150° C. in a hot air drier for 30 minutes to obtain to obtain a sheet-like hardened product having a thickness of 2 mm. The sheet-like hardened product thus obtained was then measured for volume resistivity at a temperature of 23° C. and a humidity of 65±5%. The measurements are set forth in Table 1.

EXAMPLE 2

The procedure and evaluation of Example 1 was followed except that the component (D) was changed to 1-ethynyl-1-cyclohexanol. The formulation and results of evaluation are set forth in Table 1.

COMPARATIVE EXAMPLE 1

The procedure and evaluation of Example 1 was followed except that the component (D) was not added. The formulation and results of evaluation are set forth in Table 1. In an attempt to form the composition into a sheet, the composition was heated to a temperature of 50° C. As a result, the composition partly underwent gelation. Thus, no sheet was obtained.

TABLE 1

|  |  |  | Example 1 | Example 2 | Comparative Example 1 |
|---|---|---|---|---|---|
| Component (A) | EP400A | g | 100 | 100 | 100 |
| Component (B) | CR100 | g | 5.3 | 5.3 | 5.3 |
| Plasticizer | PW-90 | g | 50 | 50 | 50 |
| Component (C) | Pt-vinyl siloxane complex | µl | 57 | 57 | 57 |
| Component (D) | 2-Phenyl-3-butyne-2-ol | g | 0.3 |  |  |
|  | 1-Ethynyl-1-cyclohexanol | g |  | 0.3 |  |
| Component (E) | #35 | g | 20 | 20 | 20 |
| Oxidation inhibitor | MARK AO-50 | g | 1 | 1 | 1 |
| Evaluation | Gelation (snap-up time/sec) | Initial | ○(10) | ○(8) | ○(6) |
|  |  | 1 hour | ○(10) | ○(8) | X |
|  |  | 2 hours | ○(10) | ○(7) |  |
|  |  | 3 hours | ○(9) | ○(8) |  |
|  |  | 24 hours | ○(10) | ○(7) |  |
|  |  | 48 hours | ○(9) | ○(8) |  |
| Volume resistivity |  | Ω · cm | $1.7 \times 10^8$ | $2.2 \times 10^8$ |  |

EXAMPLE 3

Carbon black (#35, produced by Asahi Carbon Co., Ltd.) as component (E) and MARK AO-50 (produced by ASAHI DENKA KOGYO K.K.) as an oxidation inhibitor were mixed with EP400A (produced by KANEKA CORPORATION) as component (A) in an amount of 15 g and 1 g based on 100 g of EP400A, respectively. The mixture was then kneaded over a roller three times. To the mixture was then added 5.3 g of CR100 (produced by KANEKA CORPORATION) as component (B).

Bis(1,3-divinyl-1,1,3,3-tetramethyldisiloxane)-platinum complex catalyst ($17.9 \times 10^{-5}$ mmol/µl, xylene solution) as component (C) was measured out in an amount of 57 μl. 2-Ethynyl-1-cyclohexanol was measured out in an amount of 0.3 g. The two components were then uniformly mixed. The composition thus obtained was heated to a temperature of 50° C. for 5 hours to have a lowered viscosity, and then defoamed by a vacuum-defoaming apparatus for 1 hour. The compound was then measured for viscosity at 23° C., 50° C. and 70° C. As a result, the viscosity of the compound was 2,700 Pa·s, 300 Pa·s and 90 Pa·s, respectively.

not added. The composition was then evaluated for various-properties. The results are set forth in Table 2.

As can be seen in the results set forth in Table 3, the two-part liquid composition ((I) and (II)) can be improved in its storage stability.

TABLE 2

|  |  |  | Example 4 | | Comparative Example 2 | |
| --- | --- | --- | --- | --- | --- | --- |
|  |  |  | Composition I | Composition II | Composition I | Composition II |
| Component (A) | EP400A | g | 100 | 100 | 100 | 100 |
| Component (B) | CR100 | g |  | 11 |  | 11 |
|  | PW-90 | g | 50 | 50 | 50 | 50 |
| Component (C) | Pt-vinyl siloxane complex | μl | 110 |  | 110 |  |
| Component (D) | 1-Ethynyl-1-cyclohexanol | g |  | 0.3 |  | 0.3 |
| Component (E) | #35 | g | 20 | 20 | 20 | 20 |
| Oxidation inhibitor | MARK AO-50 | g | 1 | 1 | 1 | 1 |
| Evaluation | Gelation (snap-up time/sec) | Initial | ○(8) | ○(−) | ○(6) | ○(−) |
|  |  | 1 hour | ○(8) | ○(−) | ○(−) | X |
|  |  | 2 hours | ○(8) | ○(−) |  |  |
|  |  | 24 hours | ○(8) | ○(−) |  |  |
|  |  | 48 hours | ○(8) | ○(−) |  |  |

* Note) The results of evaluation of snap-up time are set forth in the column of composition (I)

As can be seen in these results, heating caused a drastic drop of viscosity. These results substantiate that heating can enhance productivity and processability.

EXAMPLE 4

A plasticizer PW-90 (produced by Idemitsu Kosan Co., Ltd.), carbon black (#35, produced by Asahi Carbon Co., Ltd.) as component (E) and MARK AO-50 (produced by ASAHI DENKA KOGYO K.K.) as an oxidation inhibitor were mixed with EP400A (produced by KANEKA CORPORATION) as component (A) in an amount of 100 g, 40 g and 2 g based on 200 g of EP400A, respectively. The mixture was then kneaded over a roller three times. The mixture thus obtained was then measured out in 170 g each in two PP containers. In one of the two containers, bis(1,3-divinyl-1,1,3,3-tetramethyldisiloxane)-platinum complex catalyst (17.9×10$^{-5}$ mmol/μl, xylene solution) as component (C) and 1-ethynyl-1-cyclohexanol as component (D) were measured out in an amount of 110 μl and 0.3 g, respectively. These components were then uniformly mixed (to form a composition (I)). In the other container, CR100 (produced by KANEKA CORPORATION) as component (B) and 1-ethynyl-1-cyclohexanol as component (D) were measured out in an amount of 11 g and 0.3 g, respectively. These components were then uniformly mixed (to form a composition (II)). The composition in these containers were each subjected to defoamation in a vacuum agitated defoaming apparatus for 5 hours. The hardenable compositions thus obtained were each allowed to stand in a 50° C. oven. At each elapsed time, the compositions (I) and (II) were each measured out in an amount of 5 g, and then mixed. These compositions were each then measured for snap-up time at a temperature of 150° C. Those compositions showing no gelation at each elapsed time were evaluated as ○. Those compositions showing even a slight gelation at each elapsed time were evaluated as X. The results of evaluation are set forth in Table 2.

COMPARATIVE EXAMPLE 2

The compositions (I) and (II) were mixed in the same manner as in Example 4 except that the component (D) was

EXAMPLE 5

A plasticizer PW-380 (produced by Idemitsu Kosan Co., Ltd.), carbon black (#35, produced by Asahi Carbon Co., Ltd.) as component (E) and MARK AO-50 (produced by ASAHI DENKA KOGYO K.K.) as an oxidation inhibitor were mixed with EP400A (produced by KANEKA CORPORATION) as component (A) in an amount of 150 g, 60 g and 3 g based on 300 g of EP400A, respectively. The mixture was then kneaded over a roller three times. Subsequently, to the mixture was added 16 g of CR100 (produced by KANEKA CORPORATION) as component (B). Bis(1,3-divinyl-1,1,3,3-tetramethyldisiloxane)-platinum complex catalyst(17.9×10$^{-5}$ mmol/μl, xylene solution) as component (C) was measured out in an amount of 170 μl. 1-Ethynyl-1-cyclohexanol was measured out in an amount of 0.9 g. These components were then uniformly mixed. The composition was heated to a temperature of 50° C., and then subjected to defoaming in a vacuum agitated defoaming apparatus for 5 hours. The electrically-conductive composition was injected into a roller-forming mold at an injection pressure of 1 MPa to prepare five electrically-conductive rollers having an electrically-conductive rubber layer having a thickness of 3 mm and a length of 230 mm provided around an SUS shaft having a diameter of 8 mm. (The hardening temperature during formation was 150° C.) During this procedure, the viscosity of the composition used and the time required until the composition is injected into the mold were measured (the temperature of the composition during the injection into the mold was 50° C.). The rollers thus obtained were each measured for hardness (JIS A) and roller resistivity according to JIS K6301A at a temperature of 23° C. and a humidity of 65%. The electrically-conductive rollers thus prepared were evaluated also for external appearance. For the measurement of mold injection time, roller hardness and roller resistivity, the values obtained for the five rollers were averaged. As an index of the degree of variation of roller resistivity among the individual rollers, the ratio of minimum roller resistivity to maximum roller resistivity in the five rollers thus prepared was represented in terms of logarithm. The results are set forth in Table 3.

EXAMPLE 6

A plasticizer PW-380 (produced by Idemitsu Kosan Co., Ltd.), carbon black (#35, produced by Asahi Carbon Co., Ltd.) as component (E) and MARK AO-50 (produced by ASAHI DENKA KOGYO K.K.) as an oxidation inhibitor were mixed with EP400A (produced by KANEKA CORPORATION) as component (A) in an amount of 150 g, 60 g and 3 g based on 300 g of EP400A, respectively. The mixture was then kneaded over a roller three times. The mixture thus obtained was then measured out in an amount of 170 g each in two pail cans. In one of the two pail cans, bis(1,3-divinyl-1,1,3,3-tetramethyldisiloxane)-platinum complex catalyst ($17.9 \times 10^{-5}$ mmol/μl, xylene solution) as component (C) and 1-ethynyl-1-cyclohexanol as component (D) were measured out in an amount of 110 μl and 0.3 g, respectively. These components were then uniformly mixed (to form a composition (I)). In the other pail can, CR100 (produced by KANEKA CORPORATION) as component (B) and 1-ethynyl-1-cyclohexanol as component (D) were measured out in an amount of 11 g and 0.3 g, respectively. These components were then uniformly mixed (to form a composition (II)). The composition in these containers were each heated in a 50° C. oven for about 1 hour, and then subjected to defoamation in a vacuum agitated defoaming apparatus for 5 hours. The two liquid compositions were again heated in a 50° C. oven for 3 hours, and then injected into a roller-forming mold at an injection pressure of 1 MPa while being mixed at a ratio of 1:1 to prepare five electrically-conductive rollers having an electrically-conductive rubber layer having a thickness of 3 mm and a length of 230 mm provided around an SUS shaft having a diameter of 8 mm. (The hardening temperature during formation was 150° C.) The viscosity of the two liquid compositions was measured, and the time required until the compositions were injected into the mold was measured (The temperature of the composition during injection into the mold was 50° C). The rollers thus obtained were each measured for hardness (JIS A) and roller resistivity according to JIS K6301A at a temperature of 23° C. and a humidity of 65%. The electrically-conductive rollers thus prepared were evaluated also for external appearance. For the measurement of mold injection time, roller hardness and roller resistivity, the values obtained for the five rollers were averaged. As an index of the degree of variation of roller resistivity among the individual rollers, the ratio of minimum roller resistivity to maximum roller resistivity in the five rollers thus prepared was represented in terms of logarithm. The results are set forth in Table 3.

COMPARATIVE EXAMPLE 3

A composition was prepared in the same method as mentioned in Example 5. The composition was then formed into a roller in the same manner as in Example 5 except that the composition was not heated. The roller was then evaluated for viscosity of composition, mold injection time, hardness, roller resistivity, external appearance, etc. in the same manner as in Example 5. However, the temperature of the composition during injection into the mold was 21° C. The results are set forth in Table 3.

As can be seen in Table 3, heating in the formation of roller allows enhancement of productivity and processability and reduction of risk of occurrence of poor external appearance. It was also made obvious that the use of the molding process with a two-part liquid composition provides a good producibility and gives no difference in variation of roller resistivity from the one-part liquid process, making it possible to obtain rollers having no variation of electrical conductivity.

TABLE 3

|  |  |  | Example 5 | Example 6 Composition I | Example 6 Composition II | Comparative Example 3 |
|---|---|---|---|---|---|---|
| Component (A) | EP400A | g | 300 | 100 | 100 | 300 |
| Component (B) | CR100 | g | 16 |  | 11 | 16 |
| Plasticizer | PW-90 | g | 150 | 50 | 50 | 150 |
| Component (C) | Pt-vinyl siloxane complex | μl | 170 | 110 |  | 170 |
| Component (D) | 1-Ethynyl-1-cyclohexanol | g | 0.9 | 0.3 | 0.3 | 0.9 |
| Component (E) | #35 | g | 60 | 20 | 20 | 60 |
| Oxidation inhibitor | MARK AO-50 | g | 3 | 1 | 1 | 3 |
|  | Application of Heat, Yes or No |  | Yes | Yes |  | No |
| Evaluation | Mold injection time (average) | sec. | 94 | 91 |  | 450 |
|  | Roller hardness (average) | ° | 15 | 15 |  | 16 |
|  | Roller resistivity (average) | Ω | $5 \times 10^7$ | $1 \times 10^7$ |  | $8 \times 10^7$ |
|  | log (minimum roller resistivity/maximum roller resistivity) |  | 0.4 | 0.4 |  | 0.8 |
|  | Viscosity of composition during injection (temperature) | Pa · s | 20 | 23 (50° C.) | 21 (50° C.) | 227 (21° C.) |
|  | Viscosity ratio |  | — | 1.1 |  | — |
|  | External appearance |  | No problems | No problem |  | 3 specimens roughened |

EXAMPLE 7

The electrically-conductive roller prepared in Example 6 was subjected to environmental test. In some detail, the electrically-conductive roller which had been allowed to stand at a temperature of 35° C. and a humidity of 85% for 7 days was measured for roller resistivity. Subsequently, the electrically-conductive roller which had been allowed to stand at a temperature of 10° C. and a humidity of 15% for 7 days was measured for roller resistivity. As a result, the ratio of roller resistivity under the various environments was represented in terms of logarithm. The results are set forth in Table 4.

COMPARATIVE EXAMPLE 4

To 150 g of a polyester polyol (Kurapole P-2010, produced by KURARAY CO., LTD.) was added 50 g of carbon black (#35, produced by Asahi Carbon Co., Ltd.) as an electrical conductivity-providing material. The mixture was then kneaded over a roll three times. Subsequently, to the mixture was added 60 g of Colonate HX (produced by Nippon Polyurethane Industry Co., Ltd.). The mixture was then thoroughly stirred. The composition thus obtained was injected into a roller-forming mold, and then heated to a temperature of 130° C. for 2 hours to prepare an electrically-conductive roller having an electrically-conductive rubber layer having a thickness of 3 mm and a length of 230 mm provided around an SUS shaft having a diameter of 8 mm. The electrically-conductive roller thus obtained was then measured for roller resistivity under various environments similarly to Example 7. The results are set forth in Table 4.

TABLE 4

|  |  |  | Example 7 | Comparative Example 4 |
|---|---|---|---|---|
| Roller resistivity | Temperature 35° C./ humidity 85% (HH environment) | Ω | 3 × 10⁷ | 5 × 10⁷ |
|  | Temperature 35° C./ humidity 85% (HH environment) | Ω | 6 × 10⁷ | 4 × 10⁸ |
| Environmental change | log (roller resistivity (LL)/ roller resistivity (HH)) |  | 0.3 | 0.9 |

As can be seen in Table 4, the use of a composition mainly composed of an isobutylene polymer as an electrically-conductive roller material makes it possible to obtain a roller having electrical properties stable to environment.

INDUSTRIAL APPLICABILITY

In accordance with the present invention, the addition of a compound containing an aliphatically unsaturated bond as a storage stability improver to a hydrosilylating addition reaction type hardenable electrically-conductive composition comprising at least one alkenyl group-containing isobutylene polymer which can undergo hydrosilylation reaction per molecule and an electrical conductivity-providing material makes it possible to obtain an electrically-conductive composition having an excellent storage stability at high temperatures.

In accordance with the present invention, an electrically-conductive composition having an excellent storage stability at high temperatures can be provided to enable handling at high temperatures, making it possible to handle as an electrically-conductive composition having a relatively low viscosity without using a large amount of diluent or the like. Further, the use of the composition of the invention makes it possible to attain the enhancement of productivity and processability of electrically-conductive roller and the stabilization of excellent electrical properties against environmental change.

What is claimed is:
1. An electrically-conductive composition comprising the following components (A) to (E):
   (A) An isobutylene polymer having at least one alkenyl group which can undergo hydrosilylation reaction per molecule;
   (B) A compound having at least two hydrosilyl groups per molecule;
   (C) A hydrosilylation catalyst;
   (D) An acetylene alcohol having the following structure:

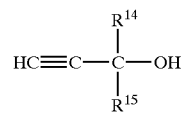

wherein $R^{14}$ and $R^{15}$ each independently represent a hydrogen atom, alkyl group or aryl group, with the proviso that $R^{14}$ and $R^{15}$ may be connected to each other to form a ring; and
   (E) An electrical conductivity-providing material.

2. The composition defined in claim 1, wherein said alkenyl group which can undergo hydrosilylation reaction in said polymer as component (A) exists at the terminal of said polymer.

3. The composition defined in claim 1, wherein the number-average molecular weight of said isobutylene polymer as component (A) is from 1,000 to 50,000.

4. The composition defined in claim 1, wherein the total amount of repeating units derived from isobutylene in said component (A) is not smaller than 50% by weight.

5. The composition defined in claim 1, wherein said compound as component (B) is a polyorganohydrogen siloxane containing at least two hydrosilyl groups on the average per molecule.

6. The composition defined in claim 1, wherein said component (D) is an acetylene alcohol having a molecular weight of not smaller than 110.

7. The composition defined in claim 1, wherein said component (D) is an acetylene alcohol having a boiling point of not lower than 140° C. at ordinary pressure.

8. The composition defined in claim 1, wherein the sum of the number of carbon atoms in $R^{14}$ and $R^{15}$ is from 4 to 8.

9. The electrically-conductive composition defined in claim 1, wherein said component (D) is at least one compound selected from the group consisting of 2-phenyl-3-butyne-2-ol, 1-ethynyl-1-cyclohexanol and 3,5-dimethyl-1-hexyne-3-ol.

10. The electrically-conductive composition defined in claim 1, wherein said electrical conductivity-providing material as component (E) is carbon black.

11. An electrically-conductive roller obtained by hardening a composition defined in claim 1 around a metallic shaft.

12. An electrically-conductive roller, obtained by heating a composition described in claim 1, to a temperature of from 30° C. to 80° C., injecting the composition into a mold, and then hardening the mold at a temperature of not lower than 100° C.

13. An electrically-conductive roller obtained by treating a composition defined in claim 1 as a two-part liquid composition consisting of a composition (I) comprising components (A), (B), (C), (D) and (E) and a composition (II) comprising components (A), (B), (D) and (E), heating the various compositions to a temperature of from 30° C. to 80° C., measuring the weight of the various compositions, injecting the various compositions into a mold while being mixed, and then hardening the mixture at a temperature of not lower than 100° C.

14. The electrically-conductive roller defined in claim 13, wherein the ratio (I)/(II) of viscosity of the composition (I) to the composition (II) is from 0.5 to 2.0.

15. The electrically-conductive roller defined in claim 11, having a resistivity of from $10^7$ to $10^{11}$ W.

16. The electrically-conductive roller defined in claim 11, having a resistivity of from $10^3$ to $10^{10}$ W.

17. The electrically-conductive roller defined in claim 11, having a resistivity of from $10^5$ to $10^{10}$ W.

18. The electrically-conductive roller defined in claim 11, having a hardness of not greater than 30°.

* * * * *